United States Patent [19]

Slutter et al.

[11] Patent Number: 5,192,981

[45] Date of Patent: Mar. 9, 1993

[54] CZERNY-TURNER MONOCHROMATOR

[75] Inventors: Warren S. Slutter, Dunellen; Joseph Marcovecchio, Berkeley Heights; Robert E. Heinz, Piscataway; David A. Kolb, Old Bridge, all of N.J.

[73] Assignee: Spex Industries, Inc., Edison, N.J.

[21] Appl. No.: 516,784

[22] Filed: Apr. 30, 1990

[51] Int. Cl.$^5$ .................................................. G01J 3/18
[52] U.S. Cl. ..................................... 356/334; 359/571; 359/858
[58] Field of Search .............. 350/618, 619, 620, 622, 350/623, 624, 626, 629, 630; 356/328, 331, 334; 359/569, 571, 857, 858, 868, 869

[56] References Cited

U.S. PATENT DOCUMENTS

| | | | |
|---|---|---|---|
| 2,670,652 | 3/1954 | Sherman | 356/334 |
| 3,414,355 | 12/1968 | Fastie et al. | 356/334 |
| 3,888,590 | 6/1975 | White | 356/334 |
| 4,022,529 | 5/1977 | White | 356/324 |
| 4,099,872 | 7/1978 | White | 356/334 |
| 4,120,586 | 10/1978 | Lessner | 356/334 |
| 4,305,663 | 12/1981 | Perkins et al. | 356/325 |
| 4,332,470 | 6/1982 | Chamran et al. | 356/325 |
| 4,634,276 | 1/1987 | Sharpe | 356/334 |
| 4,652,761 | 3/1987 | Kerr et al. | 356/334 |
| 4,697,924 | 10/1987 | Akiyama | 356/334 |
| 4,932,768 | 6/1990 | Gobeli | 350/630 |

FOREIGN PATENT DOCUMENTS

| | | | |
|---|---|---|---|
| 0054824 | 4/1982 | Japan | 356/334 |
| 0054826 | 4/1982 | Japan | 356/334 |

OTHER PUBLICATIONS

Minuteman Laboratories, Inc.; "Model 305M High Vacuum Scanning Monochromator"; pp. 1-6.
Jenkins et al; "Fundamentals of Optics"; copyright, 1957; pp. 1-12.

Primary Examiner—Bruce Y. Arnold
Assistant Examiner—R. D. Shafer
Attorney, Agent, or Firm—Handal & Morofsky

[57] ABSTRACT

A monochromator of the Czerny-Turner type includes an entrance slit, a collimating mirror for receiving light output by the entrance slit, a planar grating for receiving light reflected by the collimating mirror, a focusing mirror for receiving light reflected by the grating, and an exit slit for receiving light focused by the focusing mirror. Light generally proceeds from the entrance slit to the collimating mirror, form the collimating mirror to the grating, from the grating to the focusing mirror and from the focusing mirror to the exit slit. The improvement comprises the use of a single toroidal collimating mirror in the system in combination with a spherical focusing mirror.

7 Claims, 7 Drawing Sheets

CZERNY-TURNER MONOCHROMATOR

TECHNICAL FIELD

The present invention relates to devices for selecting light of a single wavelength useful, for example, in the generation of monochromatic light or for purposes of analysis.

BACKGROUND

Monochromators generally comprise an entrance slit for receiving a source of light to be analyzed or filtered, means for separating the light into its individual component wavelengths and an exit slit for selecting out a desired component. More particularly, monochromators of one class comprise an entrance slit, a mirror for receiving the light output by the entrance slit and collimating it, a grating for dispersing the light into its individual components, a focusing mirror for receiving those components and refocusing them into the image of the original slit for presentation at an exit slit.

Because of the nature of the optical elements involved, it is necessary that the same be arranged in an off-axis configuration. By this, it is meant that it is not possible to position the elements in a way in which the normals to all the optical elements lie along a single straight line. While, in principle, an on-axis system can be designed using lenses and a prism instead of mirrors and a diffraction grating, transmissive systems do not provide acceptable performance levels.

A necessary defect of such off-axis arrangements is the introduction of relatively severe aberrations into the system, which aberrations consist mostly of coma and astigmatism. As can be understood from the above, the magnitude of the coma bears a direct relationship to the magnitude of the off-axis angle. More importantly, the coma component also has a sign which is also a function of the off-axis angle. As is well known in the prior art, it is possible in the case of an instrument having two offaxis mirrors to adjust the off-axis angles to have opposite orientations and magnitudes which result in one coma being subtracted from the other.

One such monochromator is the so-called Czerny-Turner type monochromator. Generally, a Czerny-Turner monochromator comprises an entrance slit (serving as a source) which illuminates a first concave collimating mirror which in turn reflects the light onto grating. The grating disperses the light into its individual components and reflects those components to a focusing mirror. This mirror focuses an image of the entrance slit onto an exit slit for that component of the input light which has a wavelength which corresponds to the angular orientation of the grating.

While this does solve a portion of the problem, the absolute cancellation of coma is only possible in the zero order which, of course, is of little interest in a monochromator. It is noted that, within the zero order, the reflected light leaves in the same direction as the incident light and thus has the same width. On the other hand, if the reflected light leaves at a different angle as it does in the case of the first and higher orders, it has a width which is a function of that angular difference. This results in a degradation of the performance of the monochromator. This general problem is referred to as the anamorphic effect. It is also noted that the anamorphic effect increases progressively with wavelength.

One approach to this problem is to reduce the angular difference by introducing, for example, a littrow prism. However, this prism introduces additional aberrations and losses, and generally degrades operation of the system in other ways.

Another solution to the problem has been proposed by Fastie[1]. It has been proposed that this anamorphic effect can be cancelled by using two mirrors with two different radii. Alternatively, identical mirrors and differing angles may be used.

[1] See *Optical Engineering*, January/February 1974, Volume 13, No. 1, pages 25 et seq.

Yet another approach was proposed by Schaeffer[2] who proposed the use of two toroidal mirrors. Generally, while this solution does provide a measure of improvement, it is expensive. Toroidal mirrors are extremely expensive to manufacture with the quality necessary for spectrographic applications. Furthermore, from an economic standpoint, toroidal mirrors can only be manufactured with relatively high tolerances (e.g. $\lambda/2$ as compared to the $\lambda/10$ of conventional mirrors) and relatively degraded performance is thus experienced. Nevertheless, Schaeffer's solution, which involves a precise relationship between the four transverse and sagittal focal lengths of both of the toroidal mirrors, does offer a limited degree of performance which is acceptable in some applications.

It is an object of the present invention to improve the operation of the Czerny-Turner monochromator, in particular, by the use of a single toroidal mirror in the collimating mirror position in an asymmetric design, without the coma and large astigmatism associated with symmetrical Czerny-Turner designs and with better cost and performance characteristics than the Schaeffer or Fastie approach. Likewise, the added cost of an additional toroid is avoided.

[2] See Applied Optics, Jan., 1967, Volume 6, No. 1, pages 159 et seq.

Thus, the invention is aimed at maintaining costs of the system within a reasonable range while obtaining improved performance.

SUMMARY OF THE INVENTION

A monochromator of the Czerny-Turner type includes an entrance slit and a collimating mirror for receiving light output by the entrance slit. A planar grating receives light reflected by the collimating mirror. A focusing mirror receives light reflected by the grating. An exit slit receives light focused by the focusing mirror. Light generally proceeds from the entrance slit to the collimating mirror, from the collimating mirror to the grating, from the grating to the focusing mirror and from the focusing mirror to the exit slit. The improvement comprises the use of a toroidal collimating mirror in combination with a spherical focusing mirror.

BRIEF DESCRIPTION OF THE DRAWINGS

One way of carrying out the invention is described in detail below with reference to drawings which illustrate only one specific embodiment of the invention and in which.

BEST MODE FOR CARRYING OUT THE INVENTION

Figure 1:
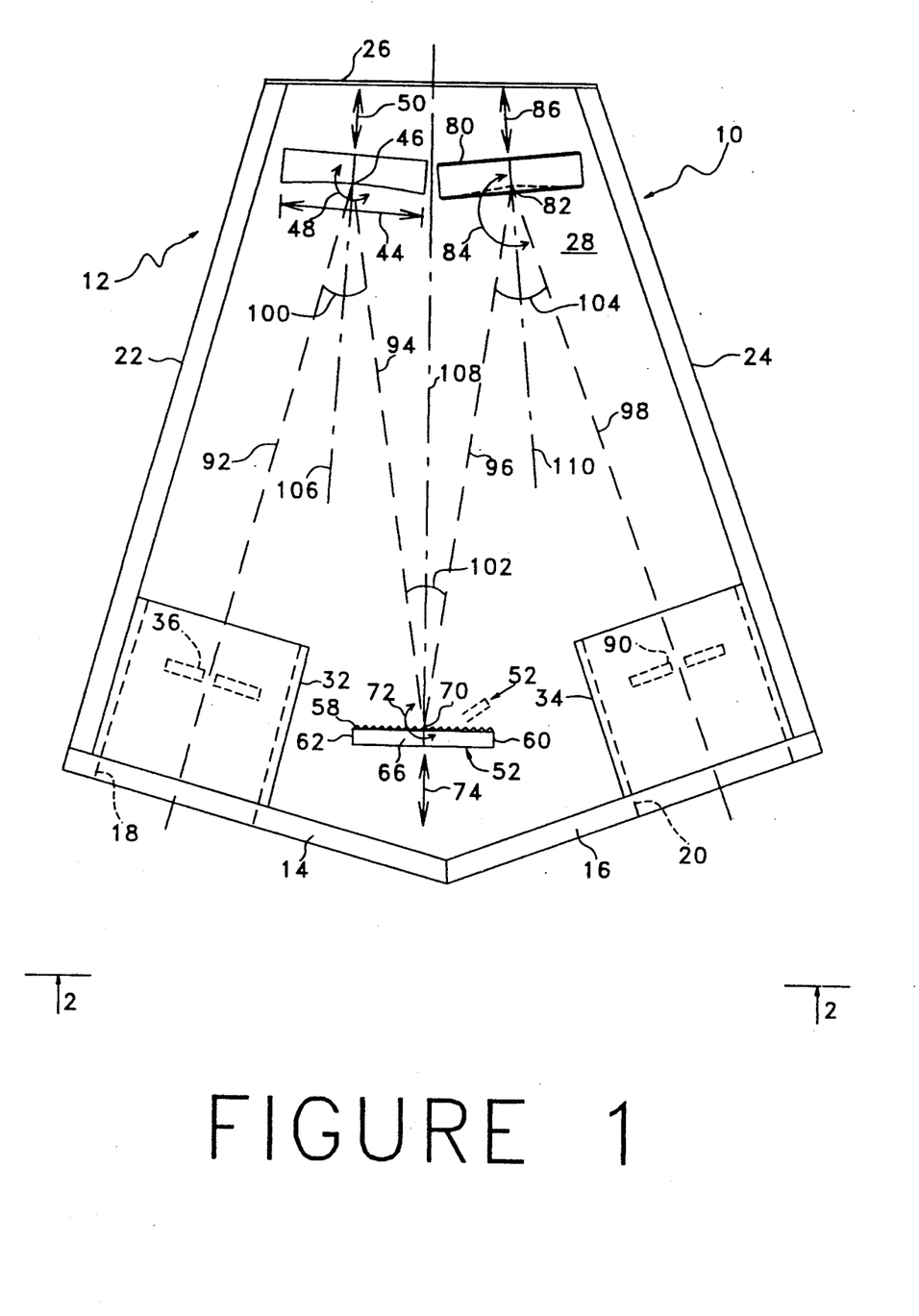
FIG. 1 is a plan view of the principal optical elements of the inventive monochromator.

A monochromator 10, constructed in accordance with the present invention is illustrated in diagrammatic form in FIG. 1. Generally, monochromator 10 comprises a housing in which comprises a pair of front panels 14 and 16 which have circular holes 18 and 20 disposed therein, as illustrated most clearly in FIG. 2.

Figure 2:
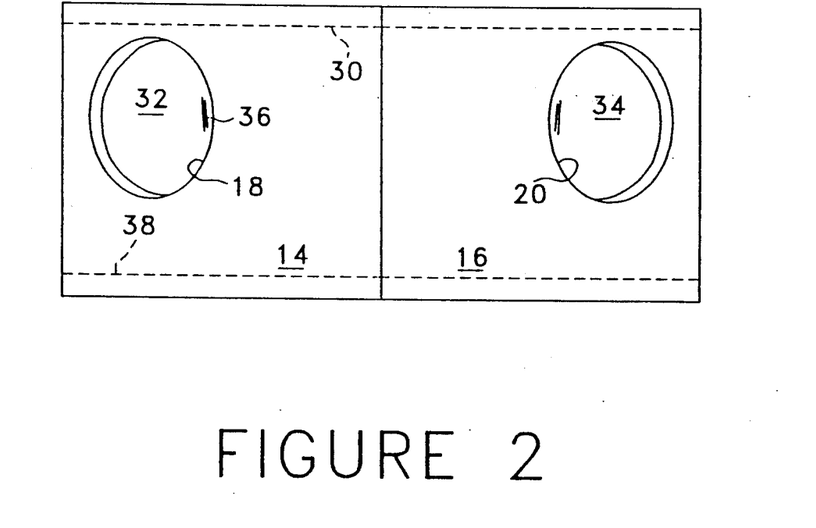
FIG. 2 is a view along lines 2—2 of FIG. 1.

A pair of side panels 22 and 24, together with a rear panel 26 complete the vertical portions of housing 12 which is closed on the bottom by a base plate 28 and on the top by top 30. Base plate 28 is an aluminum jig plate, a very flat cast material with excellent dimensional stability.

A pair of slit housings 32 and 34, which generally comprise lengths of circular tube, are positioned within housing 12 so that, together with circular holes 18 and 20, respectively, they form cylindrical chambers housing the slits of the instrument and allowing coupling of a light source to the monochromator 10.

Generally, all exposed surfaces of the housing 12 and the slit housings 32 and 34, whether they are on the inside or outside of housing 12, are covered with a black roughened surface in order to provide for maximum absorption of light. In accordance with the preferred embodiment, black anodization is the preferred technique for achieving the rough matte black surface desired.

In the view of FIG. 1, only the principal optical elements of the monochromator 10 and the housing are illustrated. In particular, the inventive monochromator 10 comprises an entrance slit 36 of conventional design. Entrance slit 36 has an adjustable width of approximately 0 to 8 millimeters and a height of approximately twenty millimeters. The center of entrance slit 36 is positioned 89.7 millimeters above the top surface 38 of base plate 28. Entrance slit 36 is generally oriented perpendicular to base plate 28.

A spherical collimating mirror 40 is mounted within housing 12. Collimating mirror 40 is a concave toroidal mirror having a rectangular shape. It has a height 42 of 50 millimeters and a width 44 of 51 millimeters. See FIG. 3. Toroidal mirror 40 is mounted on base plate 28 for rotation about an imaginary vertical axis passing through center 46 of the reflective surface of toroidal mirror 40. Mirror 40 is also positioned vertically, i.e. so that an imaginary line tangent to point 46 is perpendicular to base plate 28 and remains perpendicular to base plate 28 during rotation about the perpendicular axis defined by point 46 in the directions indicated by arrow 48. Mirror 40 is also mounted for movement in the directions indicated by arrow 50. It is noted that during operation of the instrument, mirror 40 is stationary. Rotation in the directions indicated by arrow 48 and transverse motion in the directions indicated by arrow 50 are only made during alignment of the instrument in order to ensure that it is properly positioned and perpendicular to base plate 28.

Figure 3:
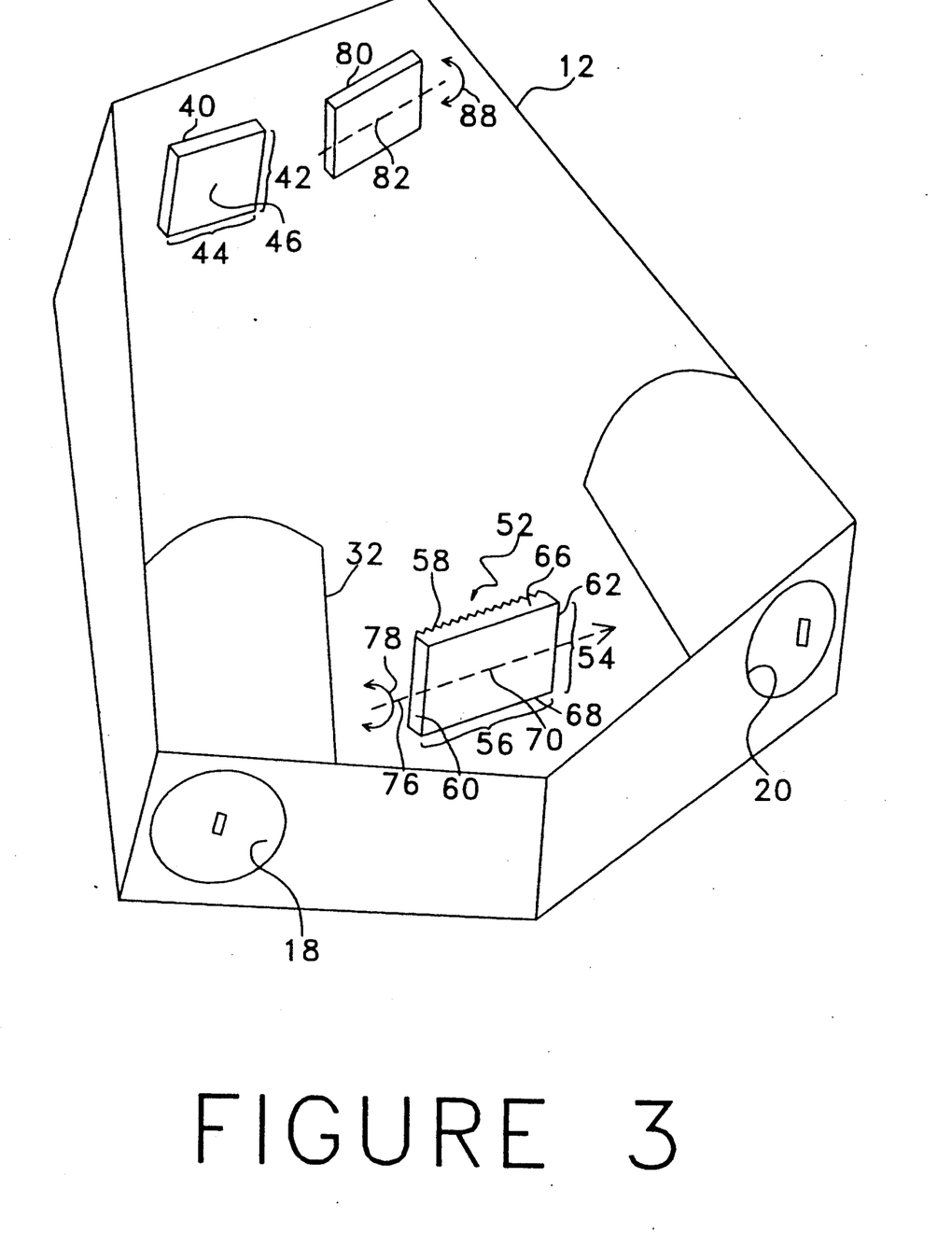
FIG. 3 is a perspective view illustrating only principal optical components of the inventive monochromator.

Mirror 40 is a toroidal mirror having a tangential focal length of 180 millimeters, which corresponds to a radius of curvature of 360 millimeters of the circle passing through point 46 and parallel to base plate 28.

Toroidal mirror 40 has a sagittal focal length of 163.5 millimeters, which corresponds to a radius of curvature of 327 millimeters in the circle defined by the surface of toroidal mirror 40, passing through point 46 and where the imaginary circle is perpendicular the base plate.

The substrate of toroidal mirror 40 is made of any suitable material, such as annealed pyrex glass or glass known in the industry as BK7 which is available from many companies, including, the Schott Glass Company and which is ground, polished, coated with a reflective aluminum layer, and, finally, overcoated with $MgF_2$. In order to get the desired level of performance, mirror 40 is ground to a tolerance of $\lambda/2$. While a higher tolerance would be desirable, present mirror grinding technology renders the above a reasonable and economic objective.

Wavelength selection in the inventive monochromator 10 is performed by a grating 52 which, in accordance with the preferred embodiment, is a planar grating having a height 54 of fifty millimeters and a width 56 of fifty millimeters. Grating 52 includes grooves 58 which are linear and are oriented perpendicular to base plate 28. Grooves 58 are parallel to the sides 60 and 62 of grating 52. The groove density of grating 52 is 1200 grooves per millimeter. It may have a blaze wavelength of 500 nanometers, or 330 nanometers depending on the range of wavelengths at which the instrument will be used. Top edge 66 of grating 52 and bottom edge 68 of grating 52 are both parallel to base plate 28.

Grating 52 is positioned with its center point 70 in the instrument plane defined as containing point 46 and being parallel to base plate 28. Grating 52 is mounted for rotational movement around an axis perpendicular to base plate 28 and passing through point 70 in the direction indicated by arrow 72. Likewise, grating 52 is mounted for forward and reverse movement in the directions indicated by arrow 74. Finally, grating 52 is mounted for rotation about an imaginary axis 76 parallel to base plate 28 and passing through point 70 on the center of the active surface of grating 52. This allows for movement in the directions defined by arrow 78.

Focusing in the inventive Czerny-Turner monochromator is performed by a spherical focusing mirror 80, which is mounted with an orientation such that an imaginary plane passing through the center point 82 and tangent to point 82 is perpendicular to base plate 28. Mirror 80 is also made of annealed pyrex glass or BK7 which is ground, polished, coated with aluminum and then over coated with $MgF_2$. In view of the relative lack of difficulty in obtaining high precision spherical surfaces, mirror 80 is ground to a tolerance of $\lambda/10$.

Mirror 80 has a focal length of 180 millimeters, which corresponds to a radius of curvature of 360 millimeters. Mirror 80 is mounted for rotation in the directions indicated by arrow 84 about an axis passing through and tangent to its center point 82 which axis is also perpendicular to base plate 28 in much the same manner that mirror 40 is mounted for rotation about an axis. In addition, mirror 80 is mounted for forward and reverse movement in the directions defined by arrow 86 and perpendicular to the plane tangent to point 82. Finally, means are provided for adjusting the tilt of mirror 80 by providing a mounting which will also allow rotation about an imaginary axis tangent to point 82 and passing through point 82 and which axis is parallel to base plate 28, as indicated by arrow 88 in FIG. 3. The position of the mirror is only varied during alignment of the device. During operation, it remains stationary.

An exit slit 90 is provided in accordance with the present invention. Exit slit 90 is perpendicularly oriented with respect to base plate 28, has a variable width of 0 to 8mm and a height of twenty millimeters. The center of slit 90 is located in the instrument plane, as defined above, together with the center 82 of mirror 80, the center 46 of mirror 40, the center 70 of grating 52 and the center of entrance slit 36.

In accordance with the preferred embodiment, distance 92 between the output of entrance slit 36 and the center 46 of mirror 40 is 174 millimeters. The distance 94 between the center 46 of mirror 40 and the center 70 of grating 52 is 190 millimeters. The distance 96 between the center 70 of grating 52 and the center 82 of mirror 80 is 190 millimeters. Finally, the distance 98 between the center 82 of grating 80 and the input of exit slit 90 is 176 millimeters.

The angle 100 between path 92 and path 94, in accordance with the preferred embodiment, is approximately 28.2 degrees. The angle 102 between path 94 and path 96 is approximately 16.76 degrees. The angle 104 between path 96 and path 98 is approximately 23.7 degrees.

During use, a light source is positioned to illuminate slit 36 resulting in light generally following path 92 to fall on toroidal mirror 40 which collimates the light. It is noted that slit 36 acts as line source of light and thus outputs rays which illuminate the surface of mirror 40.

Light rays leaving slit 36 and proceeding toward points not on the reflective surface of mirror 40 are not a problem because they either strike the inside matte black surface of housing 12 or are reflected by other optical elements onto a matte black surface.

Collimated light, after being reflected by mirror 40, then proceeds in the direction generally indicated by path 94 to fall upon grating 52 which disperses the light into its various components, sending different components as parallel wave bundles at their respective angles. These parallel bundles are then received by mirror 80 which focuses them into lines in the vicinity of exit slit 90. Depending upon the angular orientation in the directions indicated by arrow 72, only one of these bundles of light at a particular wavelength will appear at exit slit 90 and be output by the device. The particular wavelength to appear at exit slit 90 may be selected by rotation of grating 52.

As noted above, during operation of the inventive system, grating 52 is rotated in order to select out that wavelength which one desires to appear at exit slit 90. Generally, in the illustrated examples embodiment, grating 52 is rotated from the position shown in solid lines in FIG. 1 through a range of approximately 36 degrees in the counterclockwise direction as shown in phantom lines in FIG. 1.

The angular orientation at the initial position illustrated, which is also the alignment position, may be understood with reference to imaginary lines 106, 108 and 110 which, in the illustrated position, correspond to normals to mirror 40, grating 52, and mirror 80, respectively.

Referring to FIGS. 4-8, a driving engine 112 useful in the optical system illustrated in FIG. 1 is illustrated. Engine 112 is powered by a linear digital stepper motor 114 with a lead screw 116, such as that sold by Airpax under Catalog No. L92121-P1. Motor 114 is secured to an L-shaped bracket 118, which in turn, is secured to base plate 28 by a pair of screws 120 and 122. Movement of lead screw 116 in the directions indicated by arrow 126 is accommodated by a pair of holes 128 and 130 in housing 12.

A slider 132 of cylindrical cross-section is slidably supported between a pair of support members 134 and 136 which have mating holes disposed therein for receiving slider 132. Support member 134 is secured to base plate 28 by screws 138 and 140. Support member 136 is secured to base plate 28 by screws 142 and 144, as illustrated most clearly in FIGS. 4 and 5.

Figure 4:
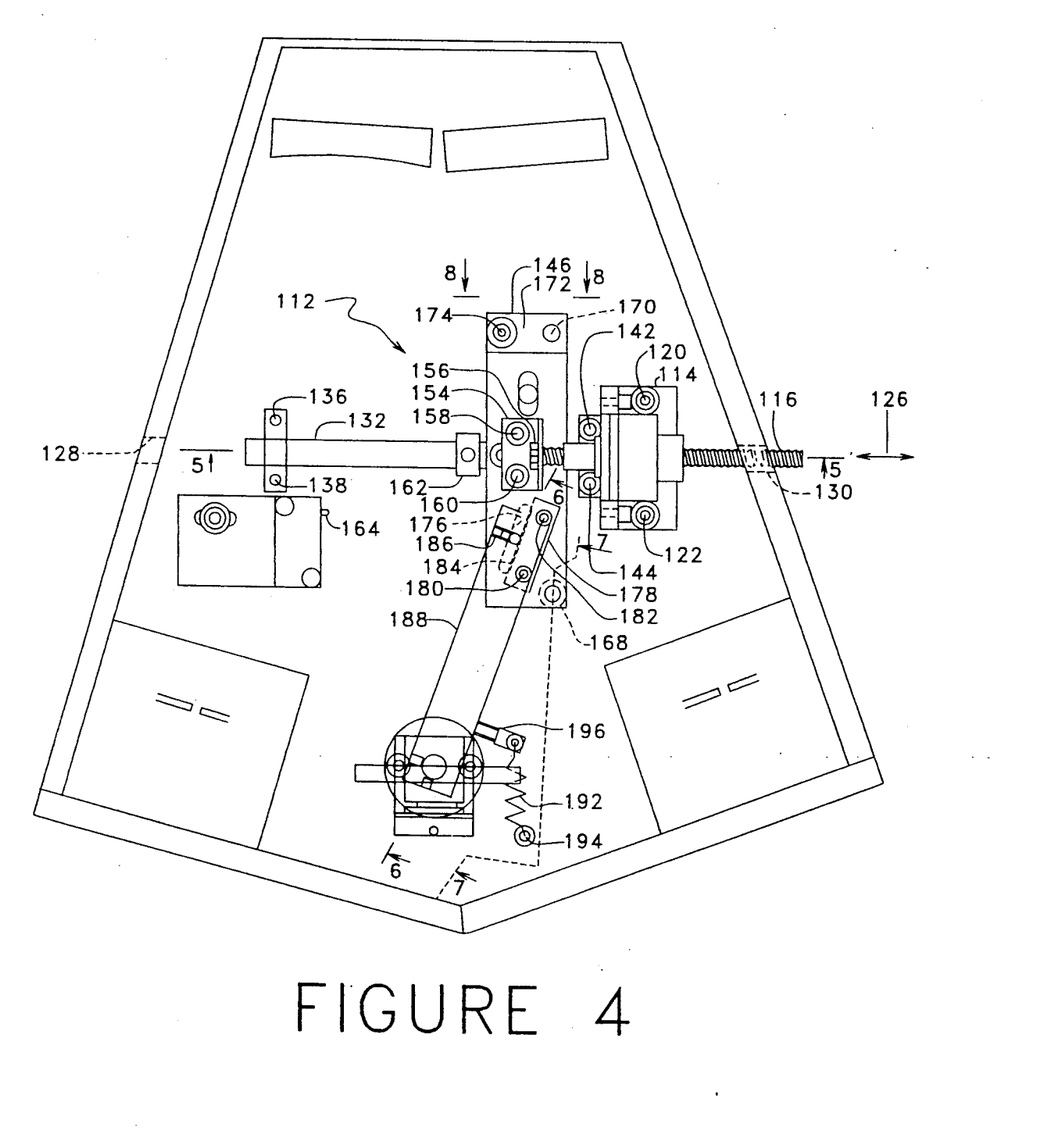
FIG. 4 is a plan view of an instrument incorporating the optics of FIG. 1.
Figure 5:
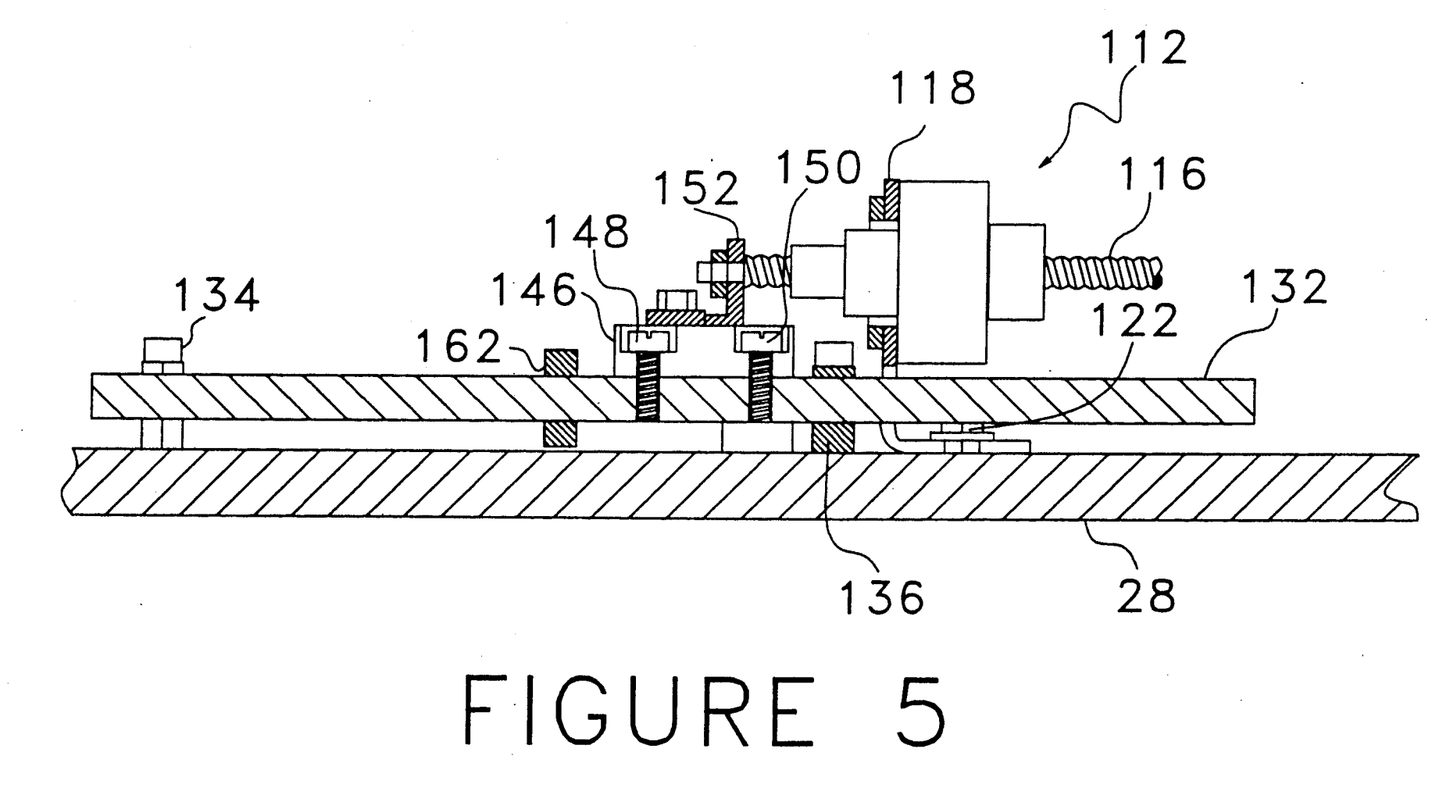
FIG. 5 is a detailed view along lines 5–5 of FIG. 1, illustrating the mechanical drive system for the inventive monochromator.
Figure 6:
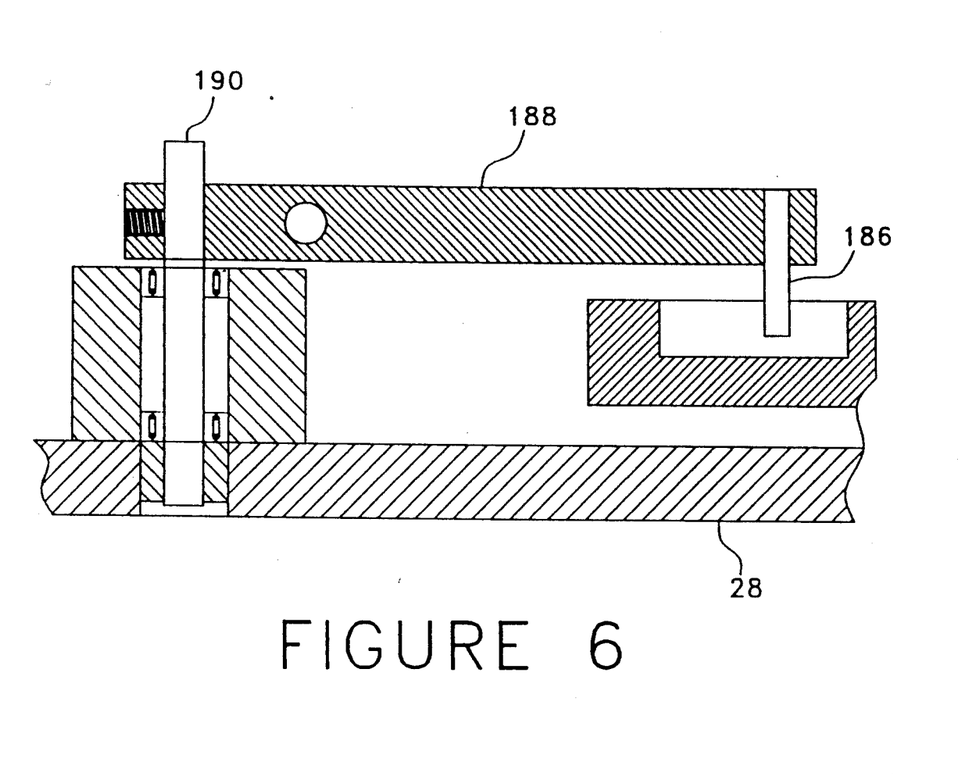
FIG. 6 is a view along lines 6–6 of FIG. 1, illustrating the coupling between the grating and the drive motor, but with the grating removed for purposes of clarity.

An actuator bar 146 is, in turn, secured to slider 132 by a pair of screws 148 and 150. The coupling member 152 of engine 112 is secured to a coupling bracket 154, which is an L-shaped bracket, by a nut 156. Coupling bracket 154, in turn, is secured by a pair of screws 158 and 160 to actuator bar 146. Motion is limited by stop ring 162 which at one extreme end actuates pushbutton microswitch 164.

Actuator bar 146 is maintained in position by moving on a pair of slider supports, namely, a teflon button 168 secured to the underside of actuator bar 146 and a teflon post 170 which is urged against base plate 28 by a leaf spring 172 which is secured to the actuator bar by screws 174. Teflon members 168 and 170 on actuator bar 146 prevent rotation of slider 132.

Figure 7:
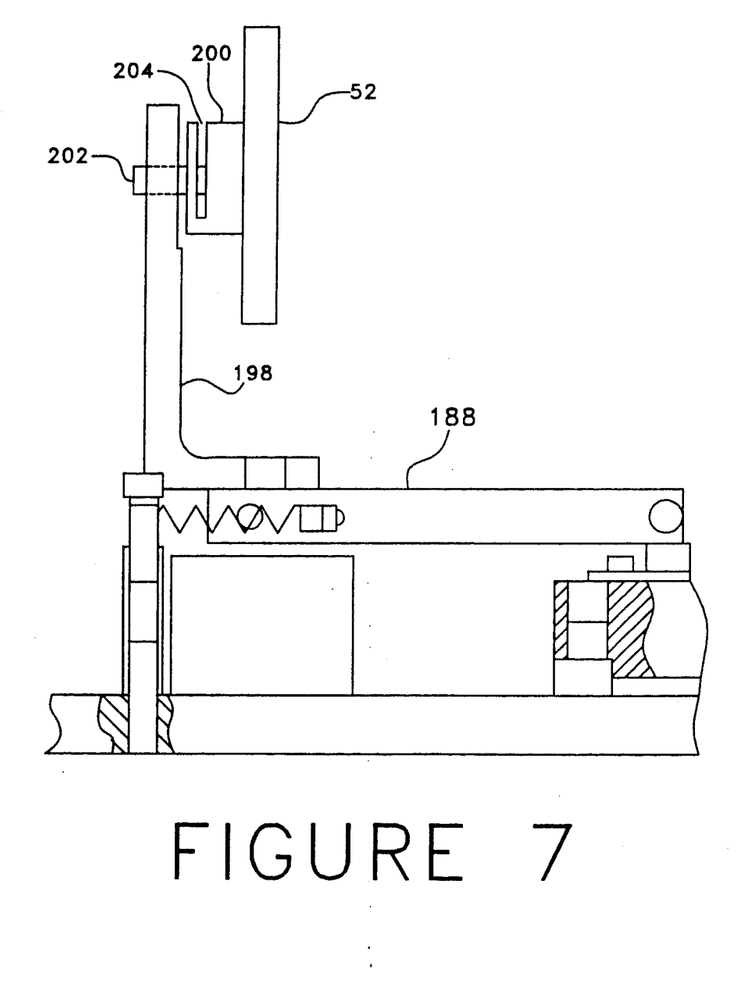
FIG. 7 is another view, similar to FIG. 6 but showing the grating and its support member in place.
Figure 8:
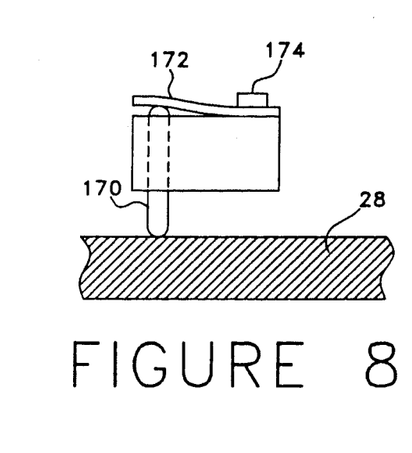
FIG. 8 is a detailed view along lines 8—8 of FIG. 4.

Actuator bar 146 includes a slot 176. A precision blade 178 is secured by a pair of screws 180 and 182 to actuator bar 146. Blade 178 includes a precision edge 184 against which a post 186 (FIG. 6) is caused to bear under a force exerted by follower arm 188. Follower arm 188 is rotatably mounted on post 190 which is secured to base plate 28. As illustrated in FIGS. 4 and 7, the desired force is provided by a spring 192 . disposed in tension between base plate support post 194 and follower arm support 196.

As illustrated most clearly in FIG. 7, grating 52 is mounted on grating support bracket 198 via U-shaped tilt spring bracket 200 which allows the adjustment of the tilt at which grating 52 is supported through the use of a set screw 202 which varies the gap 204 between opposite ends of spring bracket 200.

During operation of the system, actuation of stepper motor 114 causes engine 112 to select out different wavelengths for presentation at exit slit 90. In particular actuation of stepper motor 114 results in advancing lead screw 116 in the directions indicated by arrow 126, causing it to drag actuator bar 146 and slider 132 in the directions indicated by arrow 126. At the same time, spring 192 urges follower arm 188 against precision edge 184 of blade 178 resulting in rotation of grating 152 in response to forward and rear movement of lead screw 116.

As can be understood with reference to FIG. 4, as lead screw 116 moves linearly through stepper motor 114, the sine of the angle between a line perpendicular to the lead screw and follower arm 188 varies linearly insofar as the hypotenuse of the triangle formed thereby remains constant and the side opposite the angle varies. The sine of this angle tends to vary linearly. Because the grating is fixed with respect to follower arm 188, the sine of the angle of the grating with respect to its zero position also varies linearly. This is particularly advantageous insofar as linear variation in the sine of the angle of a grating in response to the engine results in a linear variation in wavelength at the exit slit 90.

Generally, in accordance with the present invention, during initial turn-on of the monochromator, an initial start-up sequence is actuated in accordance with which slider 132 is advanced toward button microswitch 164 resulting in actuation of the microswitch and the setting of a counter to zero. As the stepper motor 114 is successively actuated, linear variations in wavelength occur and wavelength may be computed by counting the number of pulses sent to the stepper motor control circuitry. The position of lead screw 116 may be very precisely measured through the use of a circuit which acts to determine the phase position of the motor windings by such counting from a known position thereby enabling accurate control of the monochromator.

Figure 9:
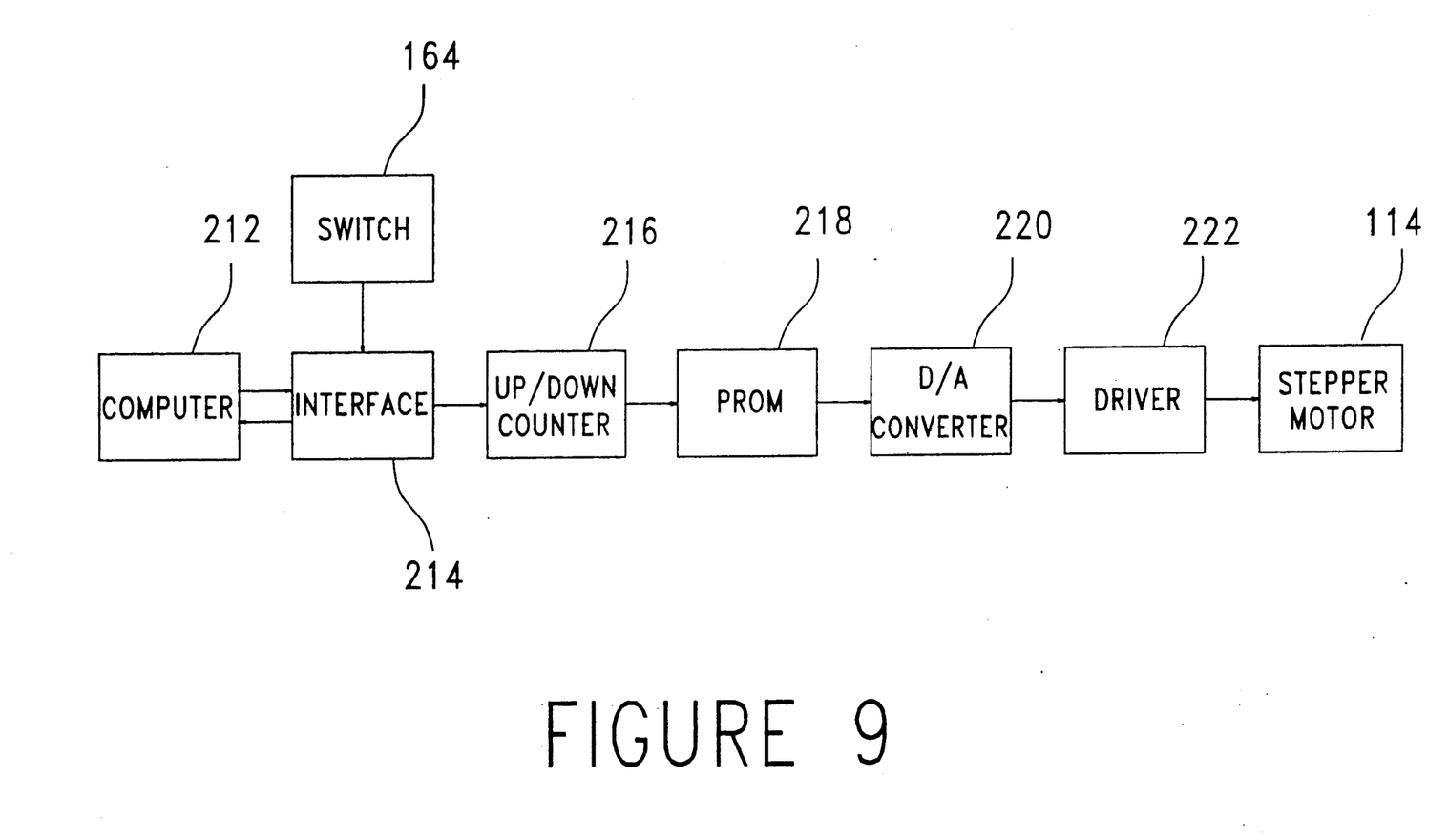
FIG. 9 is a block diagram of an electronic control circuit useful with the instrument of the present invention.

An electronic control circuit 210 for controlling stepper motor 114 during the above sequence is illustrated in FIG. 9. Generally, stepper motors, such as stepper motor 114, have permanent magnet rotors with a plurality of alternating north and south poles disposed around their periphery. The rotor poles cooperate with a like number of wound poles on a stator. In one mode of operation, the stator coils are actuated to be either on or off. Depending upon their states, the rotor can move a step at a time. Because the rotor is fixedly mounted, as it rotates, the lead screw which is threadedly mounted in its center, is caused to be linearly translated through the stepper motor.

It is also possible to operate a stepper motor in accordance with a so-called "half-step" sequence. In accordance with this type of actuation, a typical stepping motor such as that manufactured by Airpax, under Catalog No. L92121-P1, may be sequenced through an eight-half step sequence corresponding to actuation of the four inputs of the motor in the following sequence:

| HALF STEP NUMBER | 1 | 2 | 3 | 4 |
| --- | --- | --- | --- | --- |
| 1 | ON | OFF | OFF | OFF |
| 2 | ON | ON | OFF | OFF |
| 3 | OFF | ON | OFF | OFF |
| 4 | OFF | ON | ON | OFF |
| 5 | OFF | OFF | ON | OFF |
| 6 | OFF | OFF | ON | ON |
| 7 | OFF | OFF | OFF | ON |
| 8 | ON | OFF | OFF | ON |

Because, in the example considered, the stepper motor has six north poles and six south poles, sequencing through the eight half steps will advance the stepper motor rotor through one-sixth of a complete rotation. Thus, 48 half steps are required to do a full 360 degree rotation of the rotor.

In order to get the desired degree of resolution, however, use is made in the preferred embodiment of a so-called "mini-step" actuation sequence, in accordance with which eight mini-steps equal one half step. Thus, 384 mini-steps are required to achieve a single rotation of the rotor which corresponds to advancement of the lead screw by the distance between adjacent thread portions. Such mini-step operation is achieved by the replacement of the full on and full off signals sent to the four inputs of the stepper motor by analog signals of relative amplitude which result in small increments of movement of the rotor with respect to the stator.

Turning again to FIG. 9, circuit 210 may employ a computer 212 which, operating through an interface 214 increments an up-down counter 216 to provide a digital number to a programmable read-only memory 218. Up-down counter 216 maintains the current position in modulo 256. Programmable read only memory 218 translates this position to two relative current magnitudes to be sent to the windings of motor 114. Digital-to-analog converter 220 is set so that negative magnitudes are normalized to fall between 127 negative levels and 127 positive levels including a no current level, with level $+127$ being maximum current in a positive sense, and level $-127$ being maximum current in a negative sense.

The output of programmable read-only memory 218 which has the position information transformed into current levels is sent to a digital-to-analog converter 220 which receives the transformed digital position information from memory 218 and converts it to an analog signal which is coupled to driver 222. Driver 222 outputs a drive signal for advancing stepper motor 114 in accordance with a mini-step sequence.

Digital-to-analog converter 220 is available as a single integrated circuit under Catalog No. PBM 3960 from RIFA, Inc. of Greenwich, Connecticut. Likewise, driver 222 is available under Catalog No. PBL 3771 from the same company.

When the inventive monochromator is turned on, control circuit 210, acting through computer 212, initiates signals which cause up-down counter 216 to generate numbers which cause stepper motor 114 to cause slider 132 to advance toward microswitch 164 at the rate of approximately 8 millimeters per second until slider 132 actuates button microswitch 164. When microswitch 164 is actuated, slider 132 is then pulled back by stepper motor 114 at the same rate of speed. This has the effect of loosening up the system and improving repeatability by kneading the lubricants (which appear to "jell" when the instrument is not operated for a time) in the various parts of the system to a point where they reach a steady-state operating viscosity.

After the initial advancement toward the microswitch and return movement, slider 132 is again advanced toward the microswitch at approximately 8 millimeters per second until microswitch 164 is actuated for the second time and its position noted. Slider 132 is then pulled back from the microswitch at the relatively low speed of 0.8 millimeters per second for approximately one second of movement and then advanced forward toward microswitch 164 at 0.8 millimeters per second in order to precisely note the pulse in response to which the microswitch is actuated and thus the position at which the microswitch is actuated. Generally, because this approach toward microswitch 164 is slow, it results in a more repeatable actuation position, which, as will be described below, is the basis for calibration and thus is desired to be as accurately repeatable as possible. In addition, repeatability is enhanced through the use of a microswitch which includes a push-button actuator without any lever, such as the microswitch sold by Micro Switch under Catalog No. V15.

As noted above, after pulling back at 0.8 millimeters per second, slider 132 is advanced toward the microswitch at 0.8 millimeters per second. Once the actuation of switch 164 is detected by interface 214, this information is sent to computer 212 which causes stepper motor 114 to continue advancing for between four and twenty-eight mini-steps. The actual number is selected to keep the final point, which is used as a reference, sufficiently distant (at least about four mini steps or 0.01 millimeters) from the actuation point of switch 164 to eliminate errors due to the quality of mechanical repeatability and accuracy of the actuation point of switch 164.

During initial tune-up, the instrument follows the above sequence and the actual number of steps beyond actuation is selected in accordance with the above. This point is then recorded as the reference point o the hard disk of computer 212. The identity of the wavelength passed at this reference is known from alignment of the monochromator at the time of manufacture, and this information is recorded on the hard disk of computer 212.

Thus, every time the instrument is turned on, it will go through the sequence above, finally going the predetermined number of mini-steps beyond actuation at the end of the slow approach and rest at the reference point. The operator of the instrument then directs computer 212 to send advancement signals through interface 214 to counter 216 to advance the instrument to the desired wavelength. Because of the linear relationship between the number of counts and displacement of the lead screw of stepper motor 114 and the sine relationship of the mechanical linkage and the complementary sine characteristics of the grating, there is a linear relationship between the number of pulses sent by interface 214 to counter 216 and wavelength. Thus, simply counting the pulses with respect to the reference point allows one to positively determine the wavelength to which the inventive monochromator is set.

While an illustrative embodiment of the invention has been described above, it is, of course, understood that various modifications will be apparent to those of ordinary skill in the art. Such modifications are within the spirit and scope of the invention, which is limited and defined only by the appended claims.

We claim:

1. In a monochromator of the Czerny-Turner type including an entrance slit, a collimating mirror for receiving light output by said entrance slit, a planar grating for receiving light reflected by said collimating mirror, a focusing mirror for receiving light reflected by said grating, and an exit slit for receiving light focused by said focusing mirror, light generally proceeding along an optical axis which defines a plane, from said entrance slit to said collimating mirror, from said collimating mirror to said grating, from said grating to said focusing mirror and from said focusing mirror to said exit slit, the improvement comprising a toroidal collimating mirror in combination with a spherical focusing mirror, wherein the tangential focal length of said toroidal mirror substantially equals the focal length of said spherical mirror, the sagittal focal length of said toroidal mirror being less than the focal length of said spherical mirror and said sagittal focal length is measured in a plane perpendicular to the plane defined by the optical axis of the monochromator, wherein the angle of incidence with respect to the angle of reflection of the optical axis of the monochromator at the toroidal mirror is generally about 23.7 degrees and the difference between the angle of incidence and angle of reflection of the optical axis at the spherical mirror is generally about 28.2 degrees.

2. A monochromator as in claim 1, wherein the collimating and focusing mirrors are separated by a distance substantially equal to that which is required to provide enough room for assembly and alignment of the monochromator.

3. A monochromator as in claim 1, wherein the toroidal mirror is ground to a tolerance substantially greater than the tolerance of the spherical mirror.

4. In a monochromator of the Czerny-Turner type including an entrance slit, a collimating mirror for receiving light output by said entrance slit, a planar grating for receiving light reflected by said collimating mirror, a focusing mirror for receiving light reflected by said grating, and an exit slit for receiving light focused by said focusing mirror, light generally proceeding along an optical axis which defines a plane, from said entrance slit to said collimating mirror, from said collimating mirror to said grating, from said grating to said focusing mirror and from said focusing mirror to said exit slit, the improvement comprising a toroidal collimating mirror in combination with a spherical focusing mirror, wherein the tangential focal length of said toroidal mirror substantially equals the focal length of said spherical mirror, the sagittal focal length of said toroidal mirror being less than the focal length of said spherical mirror and said sagittal focal length is measured in a plane perpendicular to the plane defined by the optical axis of the monochromator, wherein said grating is mounted for rotation and said grating is rotated by a stepper motor which rotates a threaded shaft upon which a follower is mounted, said follower being coupled to said grating to rotate said grating, wherein said follower is coupled to said grating by a mechanism which, in response to linear rotation of said threaded shaft, causes the angular position of said grating to vary with a movement which defines a sinusoidal function relative to linear motion of said follower, wherein the angle of incidence with respect to the angle of reflection of the optical axis of the monochromator at the toroidal mirror is generally about 23.7 degrees and the difference between the angle of incidence and angle of reflection of the optical axis at the spherical mirror is generally about 28.2 degrees.

5. In a monochromator of the Czerny-Turner type including an entrance slit., a collimating mirror for receiving light output by said entrance slit, a planar grating for receiving light reflected by said collimating mirror, a focusing mirror for receiving light reflected by said grating, and an exit slit for receiving light focused by said focusing mirror, light generally proceeding along an optical axis which defines a plane, from said entrance slit to said collimating mirror, from said collimating mirror to said grating, from said grating to said focusing mirror and from said focusing mirror to said exit slit, the improvement comprising a toroidal collimating mirror in combination with a spherical focusing mirror, wherein the tangential focal length of said toroidal mirror substantially equals the focal length of said spherical mirror, the sagittal focal length of said toroidal mirror being less than the focal length of said spherical mirror and said sagittal focal length is measured in a plane perpendicular to the plane defined by the optical axis of the monochromator, wherein the angle of incidence with respect to the angle of reflection of the optical axis of the monochromator at the toroidal mirror is generally about 23.7 degrees and the difference between the angle of incidence and the angle of reflection of the optical axis at the spherical mirror is generally about 28.2 degrees, and wherein the optical axis of the 6. In a monochromator of the Czerny-Turner type including an entrance slit, a collimating mirror for receiving light output by said entrance slit, a planar grating for receiving light reflected by said collimating mirror, a focusing mirror for receiving light reflected by said grating, and an exit slit for receiving light focused by said focusing mirror, light generally proceeding from said entrance slit to said collimating mirror, from said collimating mirror to said grating, from said grating to said focusing mirror and from said focusing mirror to said exit slit, the improvement wherein one of said mirrors is toroidal and the other is spherical, and the optical axis of the monochromator forms a path shaped generally like the letter "W", the improvement wherein the tangential focal length of said toroidal mirror substantially equals the focal length of said spherical mirror, the sagittal focal length of said toroidal mirror is less than the focal length of said spherical mirror and said sagittal focal length is measured in a plane perpendicular to the plane defined by the optical axis of the monochromator, said sagittal focal length of the toroidal mirror being approximately about ninety percent of the tangential focal length of the toroidal mirror, said toroidal mirror being ground to a tolerance of approximately $\lambda/2$ and spherical mirror is ground to a tolerance of approximately $\lambda/10$, said grating having a line density of 1200 grooves per millimeter and being blazed to an average wavelength at which the monochromator will be used, the angle of incidence with respect to the angle of reflection of the optical axis of the monochromator at the toroidal mirror being approximately 23,7 degrees and the difference between the angle of incidence and angle of reflection of the optical axis at the spherical mirror is approximately 28.2 degrees, the optical axis of the monochromator forming a path shaped generally like the letter W, the collimating and focusing mirrors being separated by a distance substantially equal to that which is required to provide enough room for assembly and alignment of the monochromator, the collimating mirror being positioned with respect to said grating to result in the focusing of light reflected toward said collimating mirror by said grating towards a point which is out of line with said grating and said collimating mirror to minimize rediffracted light, and wherein one of said mirrors is toroidal, the collimating mirror being toroidal, and said grating being mounted for rotation.

7. A monochromator as in claim 6, wherein said grating is rotated by a stepper motor which rotates a threaded shaft upon which a follower is mounted, said follower being coupled to said grating to rotate said grating, said follower being coupled to said grating by a mechanism which, in response to linear rotation of said threaded shaft, causes the angular position of aid grating to vary with a movement which defines a sinusoidal function relative to linear motion of said follower.

* * * * *